United States Patent [19]

Kusumoto et al.

[11] Patent Number: 5,216,256
[45] Date of Patent: Jun. 1, 1993

[54] BELT POSITION DETECTING DEVICE USING TIMING MEASUREMENT

[75] Inventors: Keiji Kusumoto, Toyokawa; Naoyoshi Kinoshita, Aichi; Takahisa Nakanishi, Toyokawa, all of Japan

[73] Assignee: Minolta Camera Kabushiki Kaisha, Osaka, Japan

[21] Appl. No.: 713,147

[22] Filed: Jun. 11, 1991

[30] Foreign Application Priority Data

Jun. 12, 1990 [JP] Japan .................................. 2-061815
Jun. 12, 1990 [JP] Japan .................................. 2-153093

[51] Int. Cl.$^5$ .......................................... G01N 21/86
[52] U.S. Cl. ..................................... 250/548; 250/557
[58] Field of Search ................. 250/548, 557, 561; 356/400, 401; 355/212

[56] References Cited

U.S. PATENT DOCUMENTS

| | | |
|---|---|---|
| 3,713,571 | 1/1973 | Simonton .......................... 250/548 |
| 3,917,396 | 11/1975 | Donohue et al. ...................... 355/14 |
| 4,518,856 | 5/1985 | Blackington ........................ 250/557 |
| 4,683,380 | 7/1987 | Shipkowski et al. ............... 250/557 |
| 4,922,305 | 5/1990 | Agarwal ............................. 355/299 |

Primary Examiner—David C. Nelms
Assistant Examiner—K. Shami
Attorney, Agent, or Firm—Burns, Doane, Swecker & Mathis

[57] ABSTRACT

A detecting device for detecting the position of a rotatable image bearing member which is provided in an image forming apparatus. The detecting device has a reference member provided in the image bearing member and a sensor for detecting the reference member. The position of the rotating image bearing member is detected by this detecting device. Further, by this detecting device, the image forming apparatus is able to detect that the image bearing member is slipped in a direction perpendicularly to the image bearing member rotation direction.

12 Claims, 14 Drawing Sheets

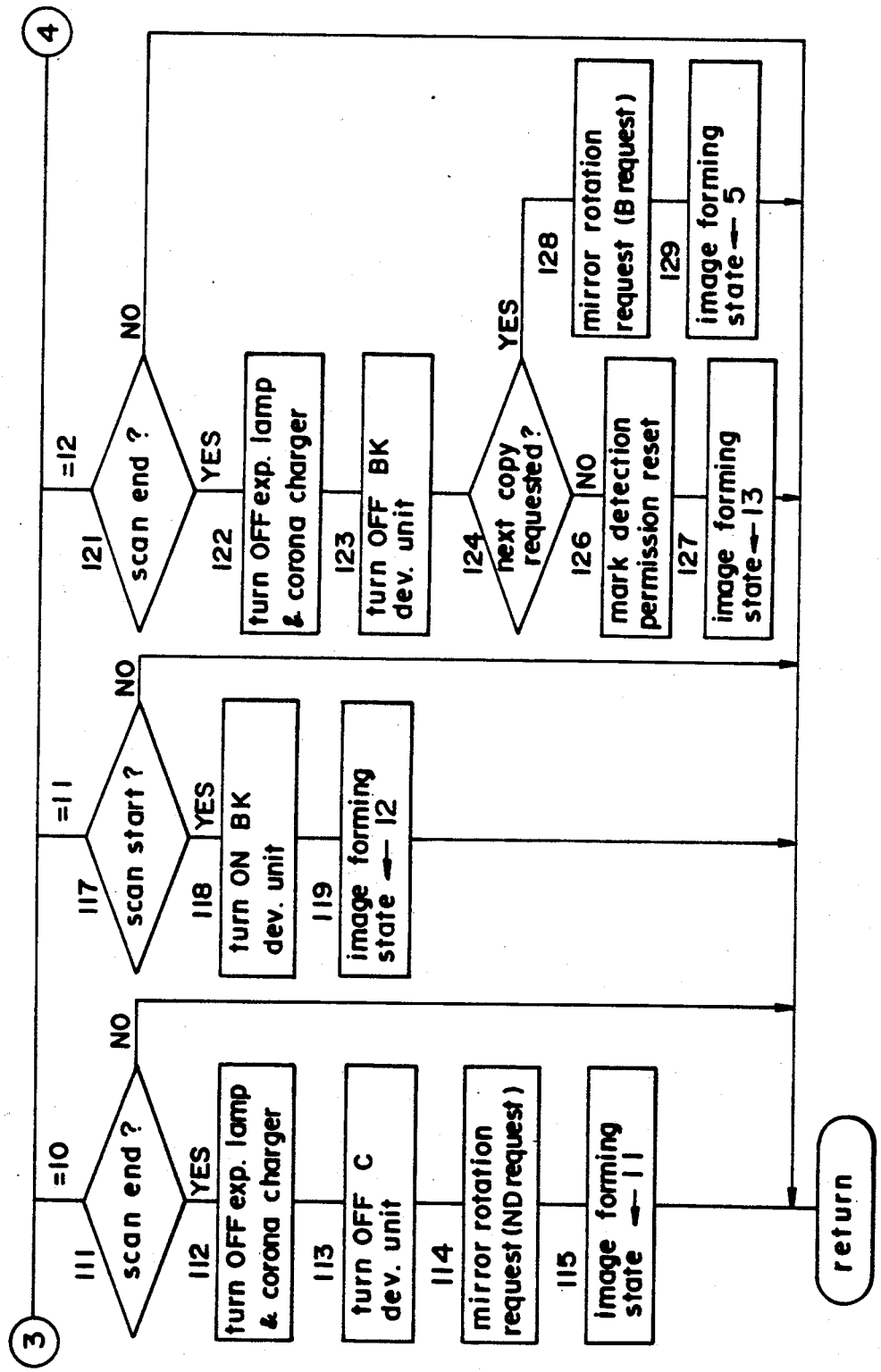

FIG. 8
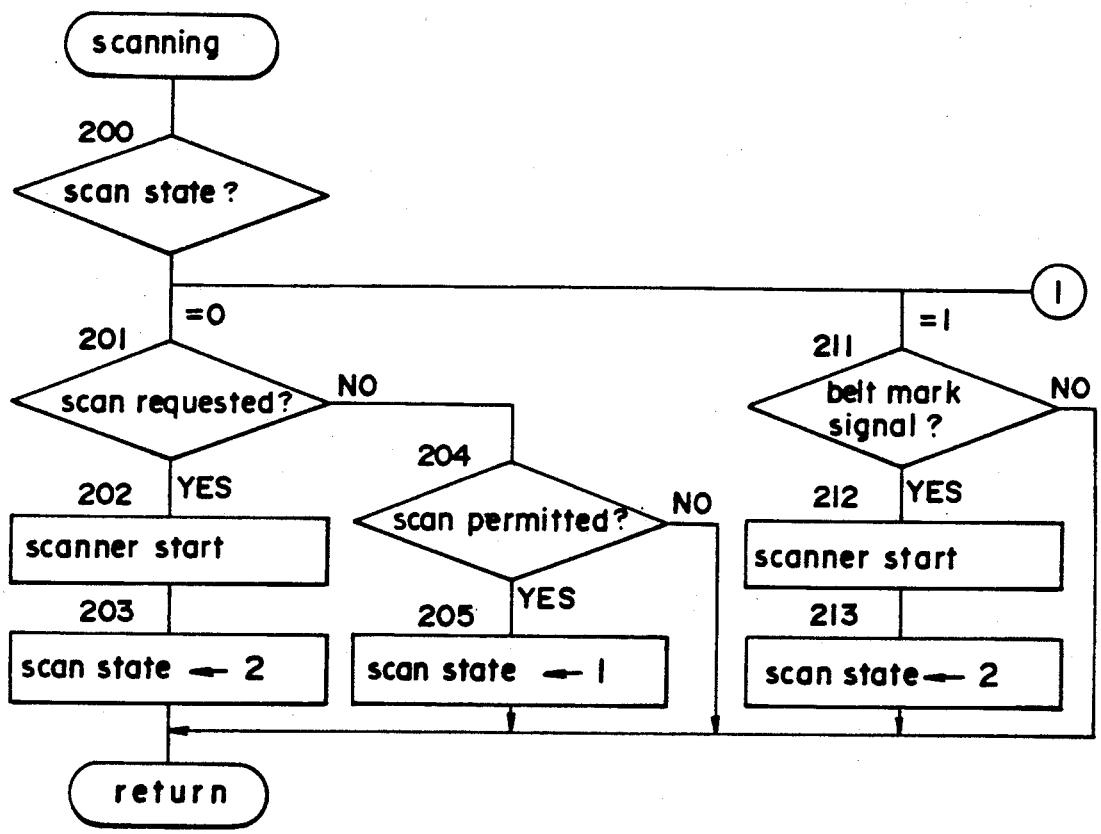
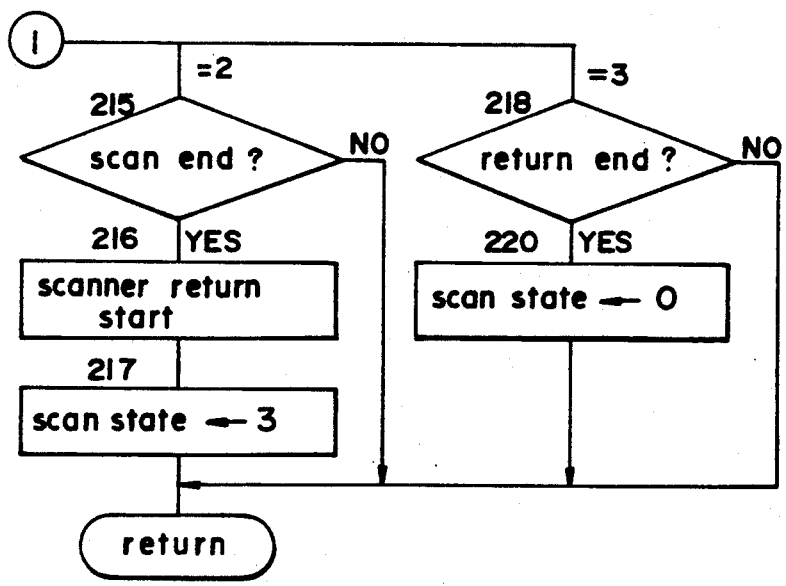

BELT POSITION DETECTING DEVICE USING TIMING MEASUREMENT

BACKGROUND OF THE INVENTION

1. Field of the Invention

The present invention relates to a rotatable image-bearing belt position detecting device for image forming apparatus.

2. Description of the Related Arts

A conventional full-color copying machine is provided a transfer belt for transferring the toner image formed on the surface of the photosensitive member.

Three primary color toner images on for example, yellow, cyan and magenta, are sequentially transferred onto the aforesaid transfer belt so as to be overlaid thereon and form a color image.

The rotation of the transfer belt and the movement of the scanner while scanning the original document must be synchronized so as to precisely overlay the three primary color toner images on the transfer belt. Therefore, the travel position (rotation position) of the transfer belt must be detected with a high degree of precision.

Conventionally, in order to detect the transfer belt position, a pulse generator disk having a slit and a sensor to generate pulse signals in accordance with the rotation of the aforesaid disk are provided on the motor shaft or the roller shaft for drivingly moving the transfer belt The aforesaid pulse signals are counted to detect the belt position.

In the previously described conventional position detection device, however, a position detection disk is mounted on the shaft of the roller or the like, such that dislocation may be produced between said disk and the transfer belt due to slippage and flexion between the roller and the belt or external oscillation and, thus, position detection cannot be accomplished to a high degree of precision.

Therefore, the movement of the transfer belt and the movement of the scanner cannot be precisely synchronized due to the aforesaid slippage. The lack of precise synchronization results in dislocation of the toner image on the transfer belt and, ultimately, image color blurring, thereby reducing image quality.

In view of the previously described disadvantages, the provision of a detection mark on the transfer belt itself has been considered as a method for preventing the reduction in detection precision caused by slippage between the roller and the transfer belt.

Precise detection of the belt position is difficult, however, when a mark provided on the belt itself is detected by a sensor due to the gradual, not rapid, rise in the sensor detection signal.

In the previously described belt position detection device wherein the belt position is detected by counting pulse signals, the position of the belt in the direction of rotation of the transfer belt can be detected, however slippage of the transfer belt perpendicularly to the direction of rotation cannot be detected.

When the transfer belt is dislocated perpendicularly to the direction of rotation the toner images formed on the transfer belt also become dislocated as they overlay one another. The aforesaid dislocation causes image color blurring and poor image quality.

In conventional copying machines, copying is executed even when lateral oscillation of the transfer belt occurs because said lateral oscillation of the belt is not detected, resulting in disadvantages such as the formation of lot quality images, unnecessary toner consumption and wasted time.

SUMMARY OF THE INVENTION

A main object of the present invention is to provide a detection device capable of detecting the precise position of a rotatable belt.

Another object of the present invention is to provide a detection device capable of detecting the precise position of an image-bearing belt in an image forming apparatus.

These and other objects of the present invention are achieved by providing a belt position detection device comprising:

a mark provided on a belt for indicating the position of said belt, wherein the length of the mark in the belt rotation direction changes perpendicularly to said belt rotation direction;

a first detection means containing a photoemitter member and a photoreceptor member fixedly disposed in proximity to the belt so as to mutually confront one another through said belt, wherein the belt mark is detected when light emitted from the photoemitter member passes through the mark and is received by the photoreceptor member so as to detect the belt position in the direction of belt rotation;

a checking means for checking the time elapsing for the detection of the belt mark by the first detection means;

and a second detection means for detecting slipping of the belt perpendicularly to the belt rotation direction based on the mark detection timing.

These and other objects, advantages and features of the present invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIGS. 6, 7a–7e, 8, 9a–9b, 10, and 11 are flow charts showing the operation of the copying machine.

DETAILED DESCRIPTION OF THE PREFERRED EMBODIMENTS

Figure 4:
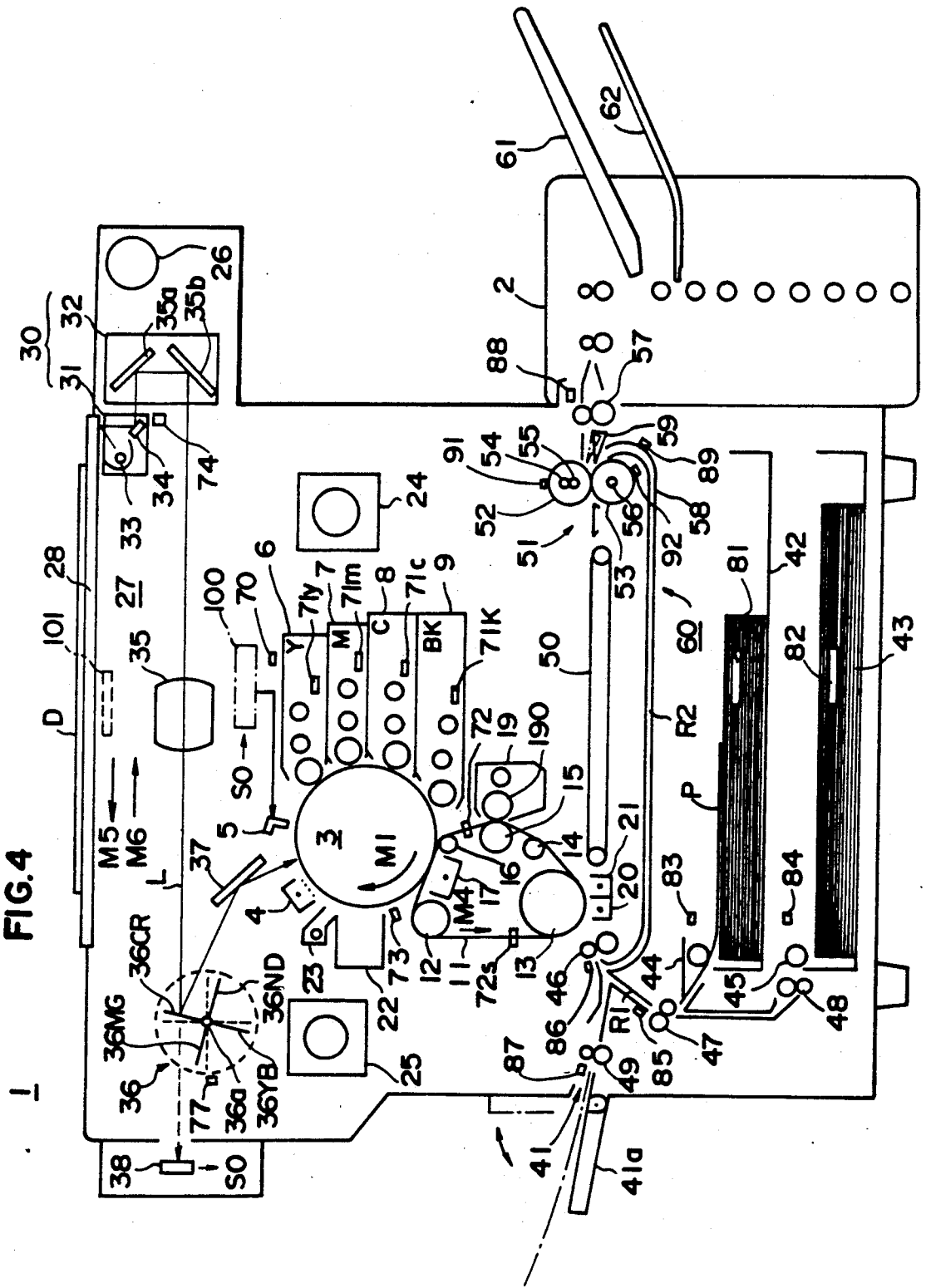
FIG. 4 is a plan view briefly showing the construction of a copying machine incorporating an embodiment of the transfer belt of the present invention.

FIG. 4 shows the essential construction of copying machine 1 related to the present invention.

The copying machine 1 is provided a photosensitive drum 3 that is rotatable in the clockwise direction (arrow M1 direction in the drawing), and arranged around the photosensitive drum 3 are a corona charger 4, a editing eraser 5, developing units 6 through 9, a transfer belt 11, a cleaning unit 22, and a main eraser 23.

The developing units 6, 7, 8 and 9 respectively accommodate yellow (Y), magenta (M), cyan (C) and black (BK) color toners, and are respectively provided toner density sensors (ATDC sensors) 71y, 71m, 71c and 71k to control the density of each color toner accommodated therein.

The transfer belt 11 is a member for temporarily maintaining (primary transfer) the developed toner image formed on the surface of the photosensitive drum 3 and for transferring (secondary transfer) said toner image to the copy sheet P. The transfer belt 11 is supported by being looped around a plurality of rollers 12 through 16 so as to be rotatable in the counterclockwise direction (arrow M4 direction in the drawing) while being always in contact with the photosensitive drum 3.

The transfer belt 11 has a TEFLON (registered trademark) coating superimposed on surface of urethane rubber so as to improve cleanability. The surface resistance of the transfer belt 11 is in the range of about $10^9$ to $10^{11}$ ohms.

The transfer charger 17 for primary transfer of the toner image from the photosensitive drum 3 onto the transfer belt 11 is disposed at the inner side of the transfer belt 11. The transfer charger 20 for the secondary transfer, the separation charger 21 for separating the copy sheet P from the transfer belt 11, and the belt cleaner 19 having a fur brush 190 for cleaning the exterior surface of the transfer belt 11 are disposed on the outer side of the transfer belt 11.

The belt mark sensors 72 and 72s for detecting the rotation position of the transfer belt 11 are provided between the rollers 15 and 16 and the rollers 12 and 13, respectively.

An optical unit 27 is provided at the top of the copying machine 1. The optical unit 2 comprises a scanner 30 disposed below the glass document platen 28 and reciprocally movable on the direction indicated by arrow M5 (outward travel direction) and the direction indicated by arrow M6 (return travel direction), a main lens 35 that is position adjustable in correspondence with the copy magnification, a mirror device 36 for color separating of the exposure light, a stationary mirror 37 for conducting the scan light L reflected by the aforesaid mirror device 36 to the exposure point on the surface of the photosensitive drum 3, and an color image sensor 38 for receiving the scan light L transmitted through the mirror of the aforesaid mirror device 36. The optical unit 27 scans the original document D during the outward travel of the scanner 30, and exposes the surface of the photosensitive drum 3.

The scanner 30 comprises a first slider 31 having an exposure lamp 33 and a mirror 34, and a second slider 32 having a mirror 35a and a mirror 35b. The return movement toward the scanner 30 reference position is detected by a scanner home position switch 74.

The mirror device 36 has a center shaft 36a to which are attached in parallel disposition at 90° angles in a fan-shaped array a half-mirror 36ND and three individual filter mirrors 36YB, 36G and 36CR. Any one of the aforesaid mirrors can be selectably and switchably positioned by rotating the aforesaid mirror device 36. The filter mirrors 36YB, 36MG and 36CR are integrated units comprising a mirror and a filter formed by vapor deposition of a blue (B), green (G) or red (R) color separation filter, respectively, on a mirror surface, and are used in connection with the Y. M or C color toners, respectively. The item 77 is a rotation position detecting sensor for determining the home position of the mirror device 36.

The paper cassettes 42 and 43 are disposed at the bottom portion of the copying machine, and a manual feed port 41 is disposed on the left side of the copying machine 1 shown in FIG. 4 so as to be openable by opening a door 41a. The aforesaid cassettes 42 and 43 and manual feed port 41 are provided the pickup rollers 44 and 45, the paper size sensors 81 and 82, paper-empty sensors 83 and 84, and the manual feed sensor 87.

The sheet P is discharged from the cassettes 42 and 43 or the manual feed port 41 and transported therefrom by take-up rollers 47, 48 and 49 to the timing roller 46 where said sheet P is held at standby.

A sheet sensor 85 is disposed in proximity to the take-up roller 47 for detecting the presence or absence of a sheet P in the paper path Rl between said take-up roller 47 and the timing roller 46. A timing sensor 86 for detecting the leading edge position of the passing sheet P is disposed in proximity to the timing roller 46.

During standby, the sheet P is transported by means of the rotation of the timing roller 46 with a timing synchronized with the transfer belt 11, such that the secondary transfer of the toner image from the transfer belt 11 onto the sheet P is accomplished at the transfer position. Thereafter, the sheet P is transported to the fixing unit 51 by the transport belt 50.

The fixing unit 51 comprises a top roller 52 having heater lamps 54 and 55, and a bottom roller 53 having a heater lamp 56. The thermistor-type heat sensors 91 and 92 are disposed in proximity to the rollers 52 and 53, respectively.

After fixing, the sheet P is transported to the sorter 2 by the discharge roller 57, and discharged either to the tray 61 of sorter 2 or the sorter bin 62. A discharge sensor 88 is disposed near the discharge roller 57. An inverting device 60 for re-fixing is also provided in the copying machine 1. The inverting device 60 is provided a transport mechanism 58 having an inverting path R2, a switching hook 59, and an inverted sheet sensor 89.

Item 24 is the main motor for driving each member related mainly to the supply and transporting of the sheets P. Item 25 is a PC motor for driving the photosensitive drum 3, the transfer belt 1 and the like. Item 26 is the cooling fan.

During color copy image formation by the copying machine 1, one original document D is scanned a total of four times, and the individual mirrors B, G, R or ND and the individual developing units 6 through 9 are selectively switched for each scan. The formation and developing of the color separated latent images of the original document D are accomplished, and the resulting toner images are sequentially transferred onto the transfer belt 11 in the primary transfer process, such that the individual color tone images are overlaid on the surface of the transfer belt 11.

The individual toner images must be transferred to exactly the same position on the surface of the transfer belt 11 when the toner images are overlaid (multiple transfer). Therefore, in the present embodiment of the copying machine 1, the timing to start the movement of the scanner 30, i.e., the timing to start the formation of the latent image on the photosensitive drum 3, is controlled using as a reference the generation timing of the belt mark signals S10 output by the previously described belt mark sensors 72 and 72s.

Figure 1:
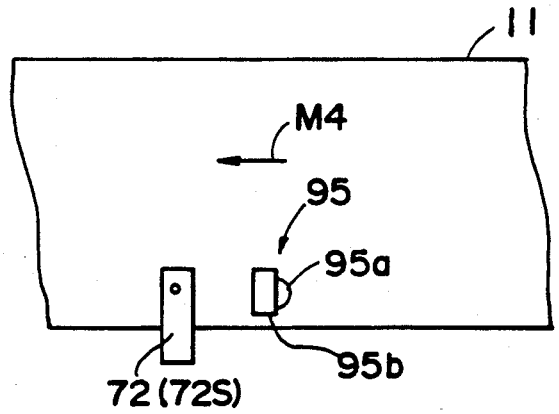
FIG. 1 is an elevation view of the rear side of an embodiment of the transfer belt of the present invention.
Figure 2:
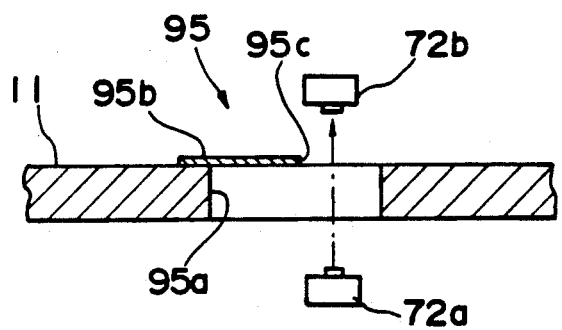
FIG. 2 is an enlarged section view of the transfer belt shown in FIG. 1.

FIG. 1 is an elevation view of an embodiment of the invention viewed from the back of the transfer belt 11
FIG. 2 is an enlarged section view of the transfer belt 11 of FIG. 1.

The transfer belt 11 is provided a detection mark 95 for detecting the rotation position of the belt 11 by means of the belt mark sensors 72 and 72s.

The detection mark 95 comprises a circular hole 95a provided in the transfer belt 11, and a sheet-like or film-like shield plate 95b attached by adhesive material to the interior surface (back side) of the transfer belt 11 so as to block one-half the aforesaid hole 95a.

As shown in FIG. 2, the shield plate 95b has a rectangular shape with the edge 95c disposed in the travel direction (indicated by the arrow M4 in FIG. 1) of the transfer belt 11, such that the opening of the hole 95a is partially blocked by the shield 95b so as to form a semicircular shape.

The belt mark sensors 72 and 72s comprise a photoemitter 72a and a photoreceptor 72b for detecting the edge 95c of the shield 95b fixedly mounted so as to have the transfer belt 11 positioned therebetween.

Accordingly, when the light emitted by the photoemitter 72a is blocked by the transfer belt 11 such that said emitted light does not enter the photoreceptor 72b, the belt mark sensors 72 and 72s do not output the belt mark signals S10. The belt mark sensors 72 and 72s do output the belt mark signals S10 when the belt mark 95 is positioned between the photoemitter 72a and the photoreceptor 72b so that the light emitted by the photoimmiter 72a enters the photoreceptor 72b.

The light is blocked by the shield plate 95b when the detection mark 95 passes between the photoemitter 72a and the photoreceptor 72b, but when the edge 95c passes therebetween, the light is switched form a shielded state to a transmitted state.

Since the edge 95c of the shield 95b is a straight line the thickness of which is thin, the light received by the photoreceptor 72b enters therein suddenly, albeit at a uniform rate of increase, during the passage of the edge 95c. Accordingly, the belt mark signal S10 rises suddenly. Since the detection position is constant, the output timing of the belt mark signals S10 are uniform even when the detection mark 95 slips perpendicularly to the direction of belt travel relative to the photoreceptor 72b.

Further, since the belt mark sensors 72 and 72s are transmission type photosensors, they provide high precision under repeated operation compared to reflective type sensors.

Accordingly, the rotation position of the transfer belt 11 can be accurately detected with a high degree of precision by the means of the detection mark 95 having the previously described construction and, thereby, the operation of the transfer belt 11 and the scanner 30 can be precisely synchronized. As a result, the toner images can be overlaid on the surface of the transfer belt 11 with a high degree of precision, thereby improving image quality.

Further, the hole 95a is circular in shape, such that the circumference of said hole 95a completely lacks corner portions that can readily crack. Thus, cracks and ruptures from the hole 95a cannot readily generate, and durability is improved.

Figure 3:
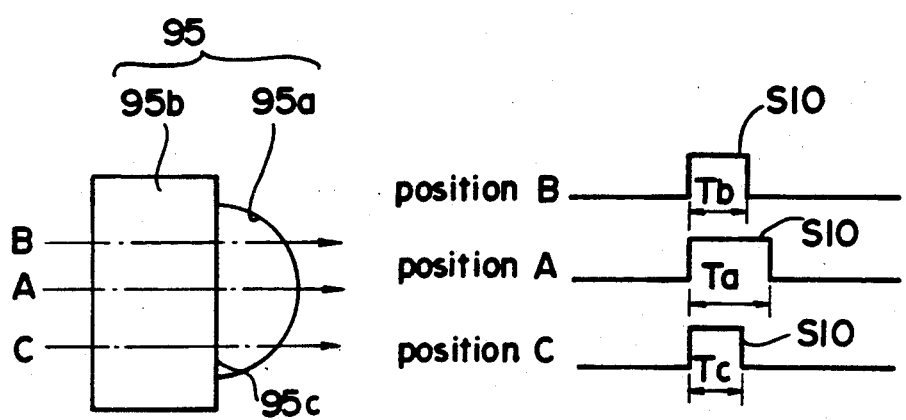
FIG. 3 is an illustration showing the transfer belt detection mark at detection times.

FIG. 3 is an illustration showing that the detection time for belt mark signal S10 is difference according to the detected position of the detection mark 95.

When the center position (A position) of the hole 95a passes the belt mark sensors 72 and 72s, the detection times (ON time) for the belt mark signal S10 output from the belt mark sensors 72 and 72s are the longest time T. When, for example, the hole position slips from the A position to the B position or the C position, the detection time for the belt mark signals S10 are shortened to time $T_b$ and $T_c$, respectively.

During normal travel of the transfer belt 11, the belt mark sensors 72 and 72s are positionally adjusted beforehand to the A position of the hole 95a. Accordingly, when the belt 11 slips perpendicularly to the travel direction for whatever cause, the detection time for the belt mark signals S10 becomes shorter compared to the normal detection time.

Thus, slippage of the transfer belt 11 can be detected perpendicularly to the travel direction using the difference in the detection times as previously described. That is, when the time required to detect the belt mark signals S10 is checked and is, for example, a specified period (for instance, the period required for the transfer belt 11 to pass the distance of 100 um) shorter than the normal detection time, the transfer belt 11 is determined to have slipped perpendicularly to the rotation direction. Thus, a transfer belt 11 abnormal condition state is detected, and then the image forming operation is terminated, or the operator is alerted to the abnormal condition status.

The transfer belt 11 is looped around the rollers 12 through 16, and makes contact with said rollers 12 through 16 such that the surface of the exterior side of the belt 11 is extended and the surface on the interior side (back side) is contracted. Thus, the shield 95b attached to the transfer belt 11 deforms in the contact portion that makes contact with the rollers 12 through 16, but the shield 95b is not readily separated from the belt by the severe pressure applied by the rollers 12 through 16 due to being fixedly adhered to the interior side surface of the transfer belt 11. Therefore, when the aforesaid configuration is used as a mark attached to the transfer belt 11, diminishment through the printing process does not occur and durability is improved.

Further, when the copying machine 1 is stopped or the travel of the transfer belt 11 is halted on standby status, the transfer belt 11 is controlled so as to stop at a position at which the detection mark 95 is not in contact with the rollers 12 through 16, i.e., the detection mark 95 is stopped at a position removed from the rollers 12 through 16. For example, the movement of the transfer belt 11 may be controlled so as to stop at a moment during which the belt mark signals S10 are output by the belt mark sensors 72 and 72s.

Figure 5:
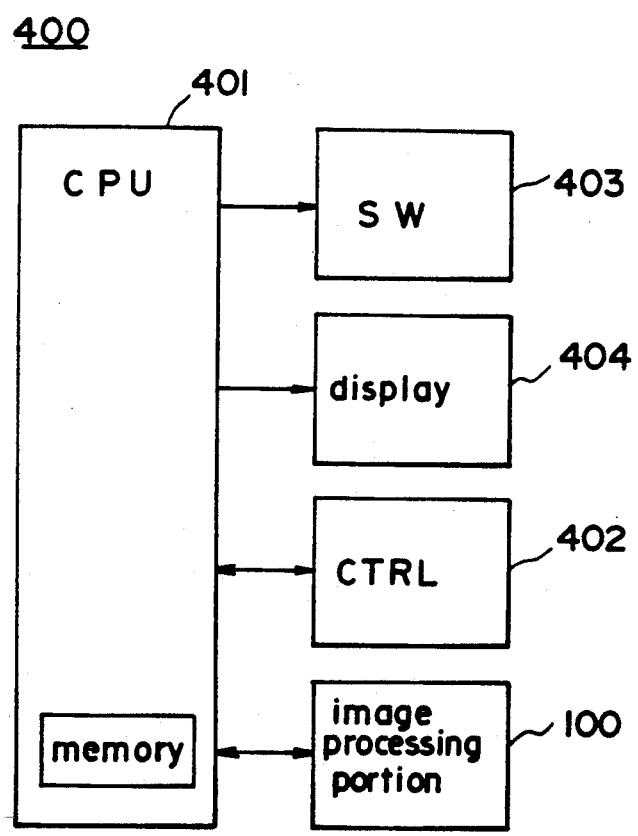
FIG. 5 is a block diagram of the copying machine control circuit.

FIG. 5 is a block diagram of the control circuit 400 of the copying machine 1.

The control circuit 400 is built around a central processing unit (CPU) 401 for controlling all operations of the copying machine 1, and provides a controller 402 for controlling the actuation of components such as the scanner 30, the exposure lamp 33, the corona charger 4, the PC motor 25 and the like, various switches 403 arranged on an operation panel or the like not shown in the drawing, a display portion 404, and an image processing portion 100 for image formation using the image sensor 38 and the like. Although not shown in the drawing, the various sensors including the belt mark sensors 72 and 72s and the like are connected to the CPU 401 through suitable interfaces.

The CPU 401 also includes an internal memory for storing programs and various data and the like.

The operation of the copying machine 1 is hereinafter described with reference to the flow charts.

Figure 6:
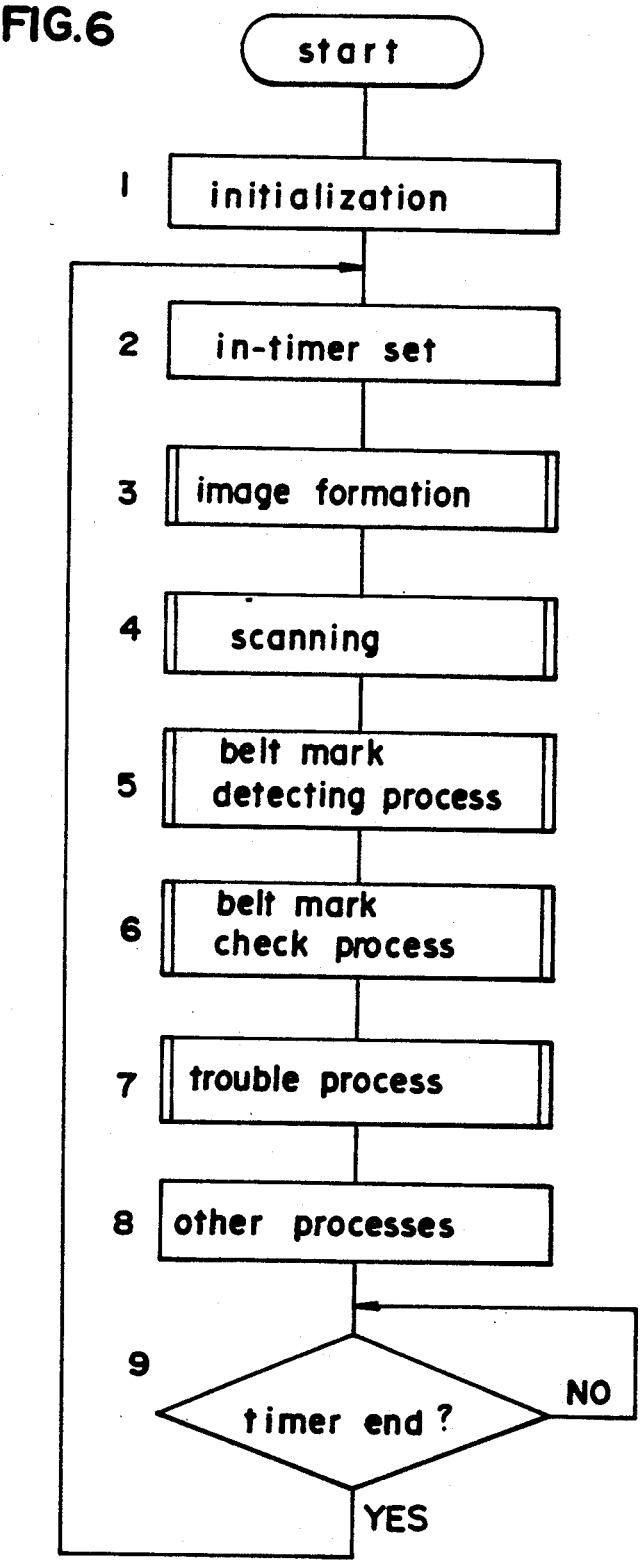
Figure 7A:
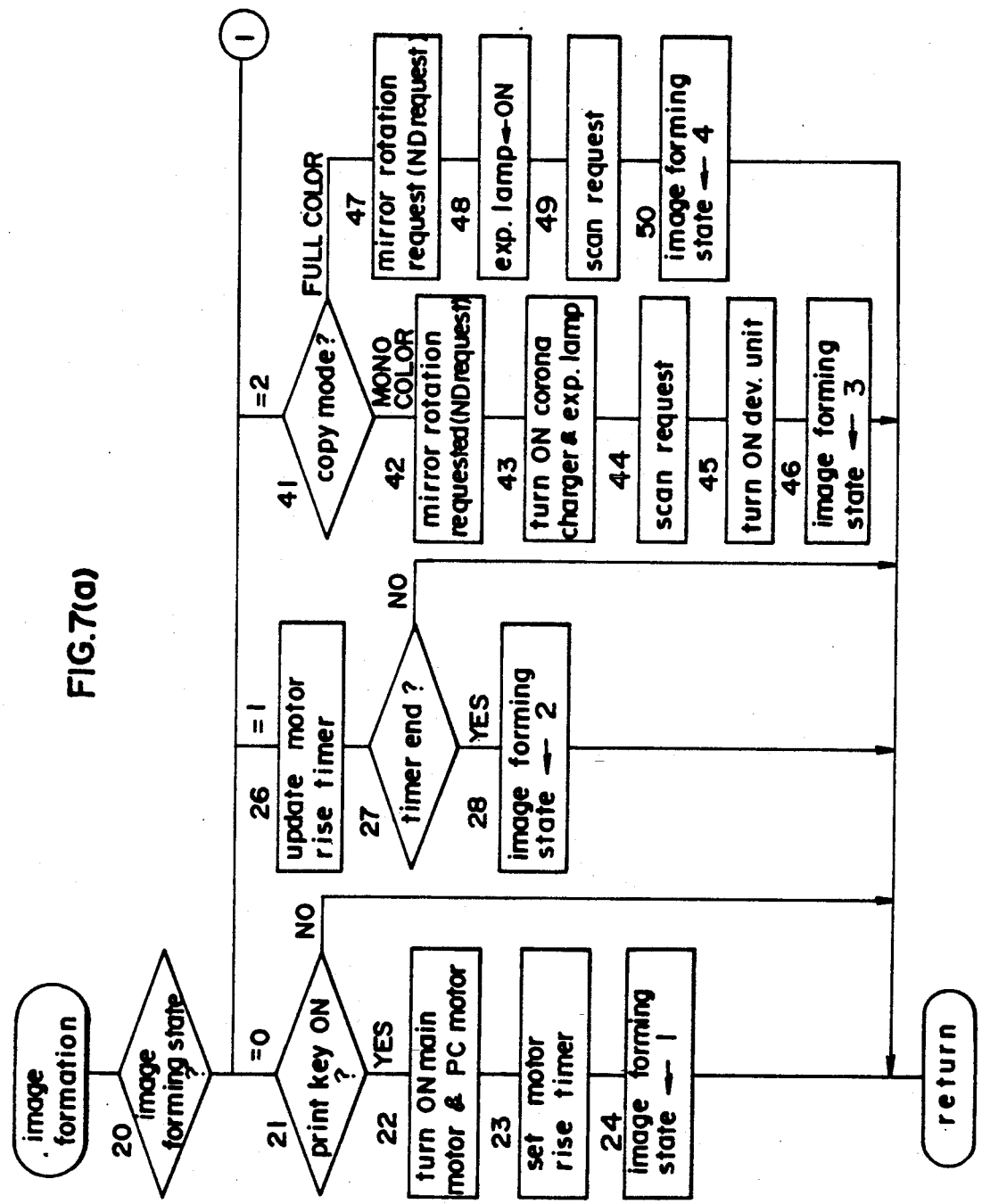
Figure 7B:
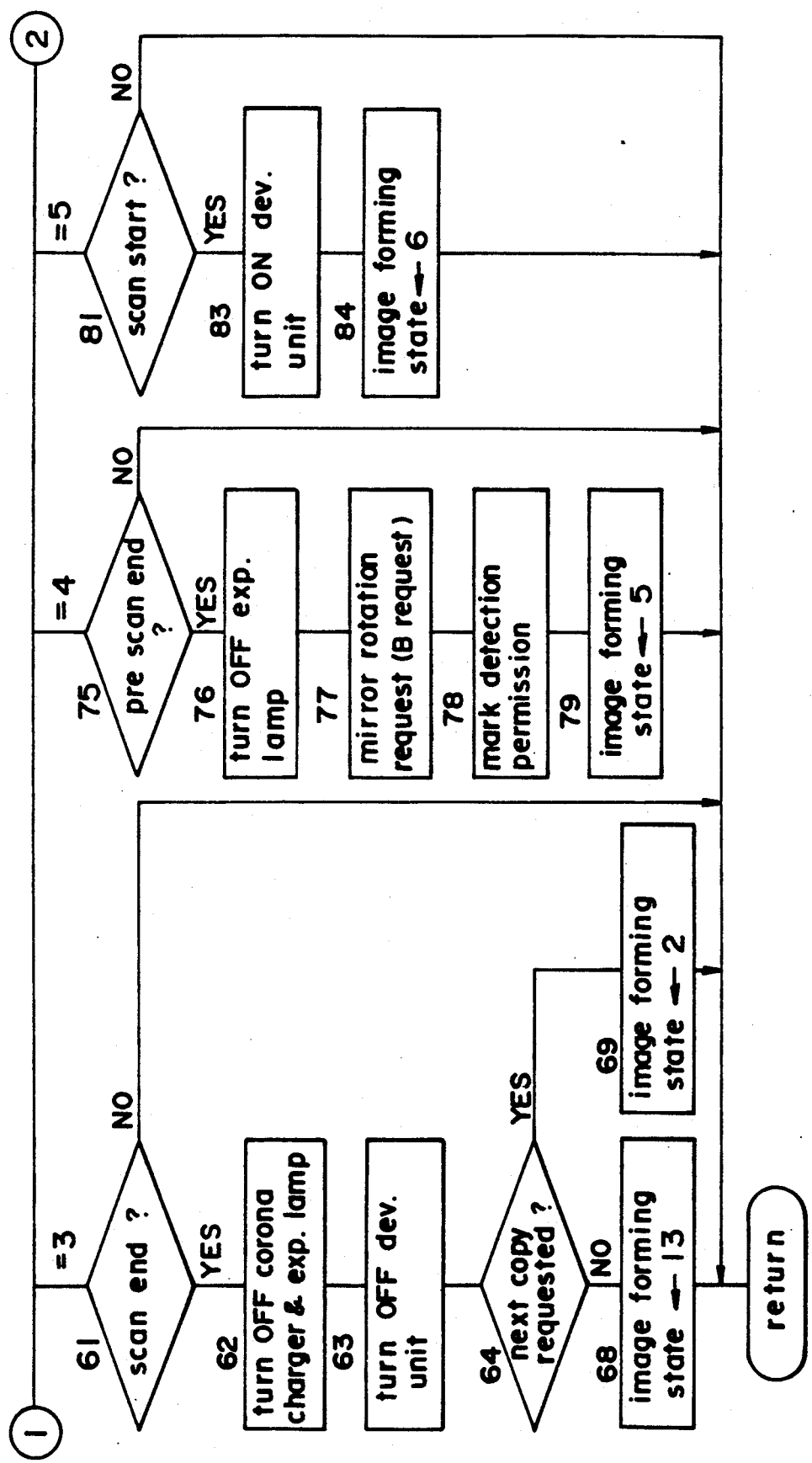
Figure 7C:
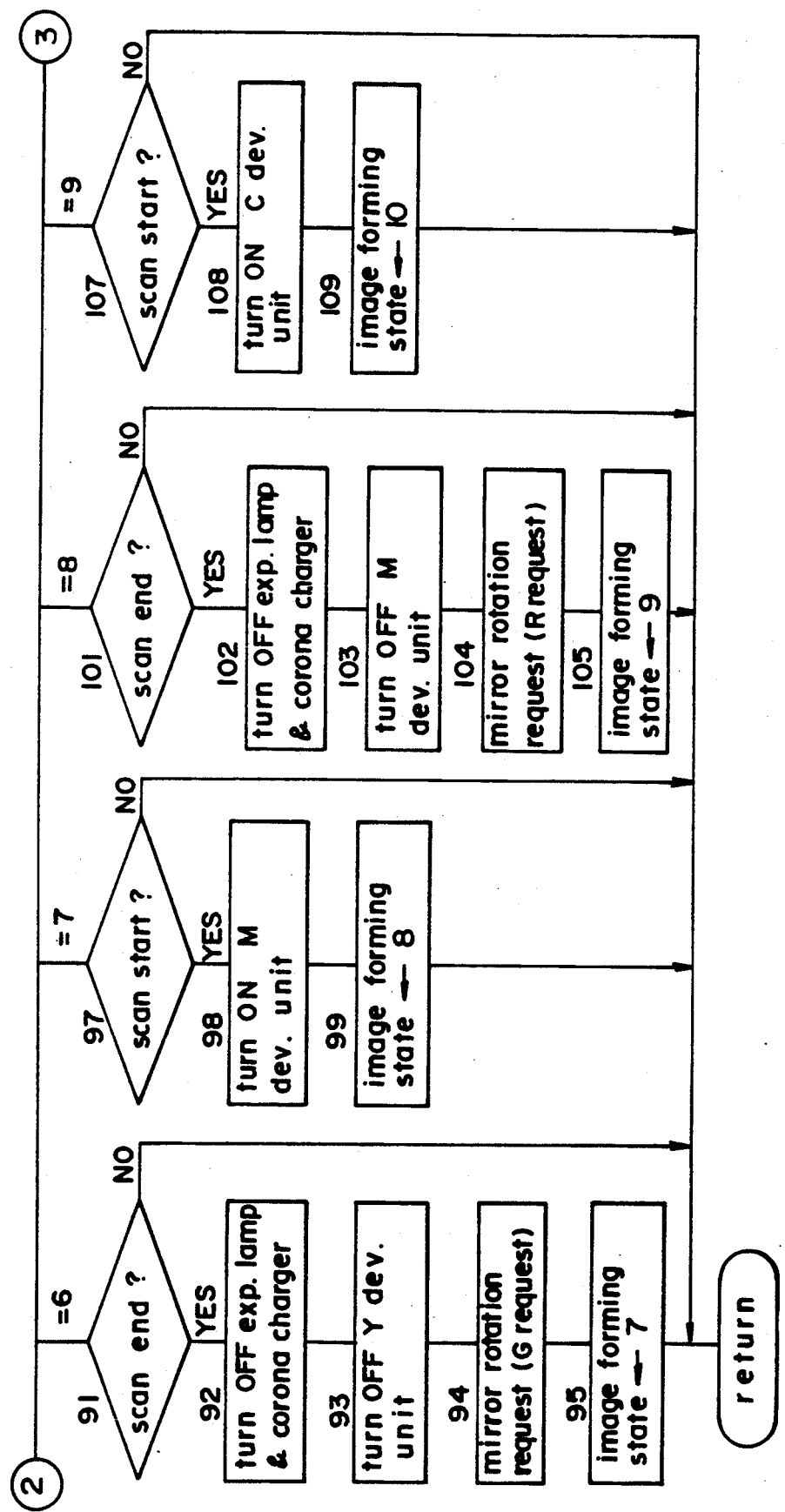
Figure 7E:
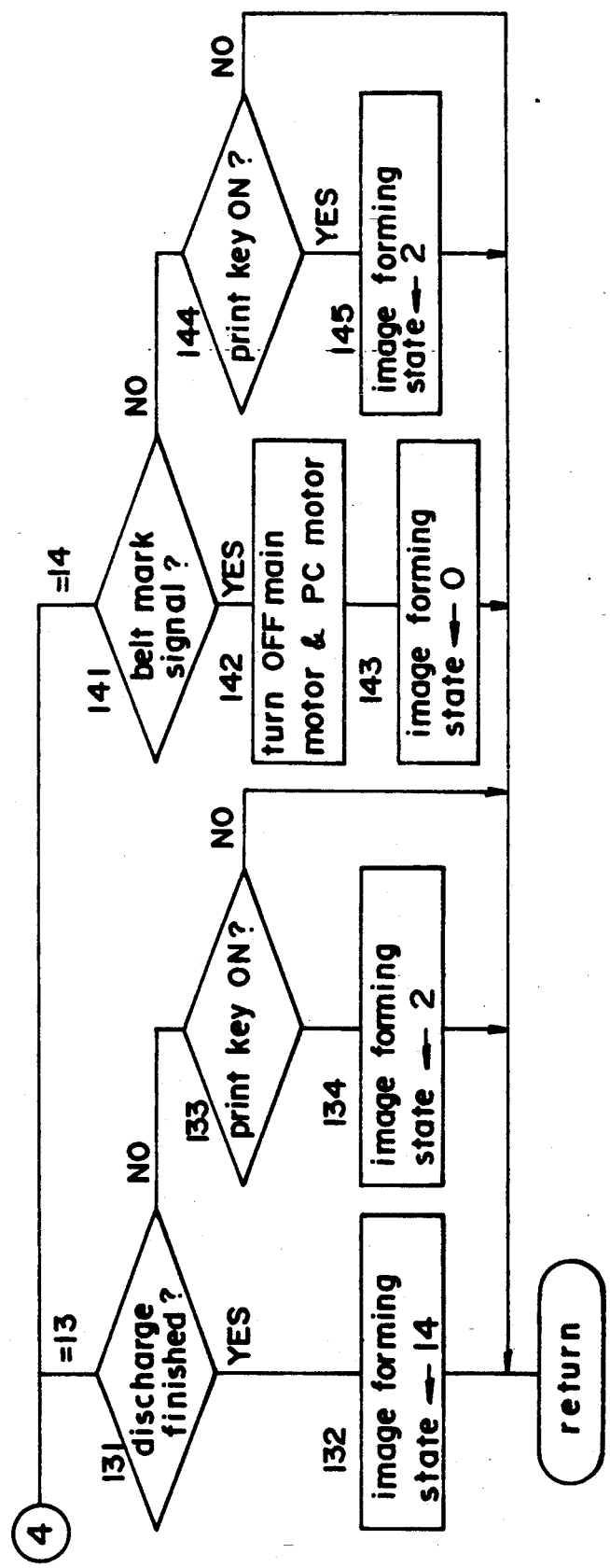

FIG. 6 is a main flow chart showing the essential operations of the CPU 401.

When power is supplied and the program starts, the registers and peripheral interfaces are initialized (step 1), and the CPU 401 internal timers are set to standardize the length of one routine.

In step 3, processing related to the electrophotographic process is executed, and in step 4 the scan processing for the scanning of the original document D is executed.

Subsequently, in step 5, the belt mark detecting process is executed to determine the timing of the multiple transfers, the belt mark check process is executed in step 6, and the trouble process is executed in step 7, respectively.

In step 8, a series of copying sequence processes are executed comprising the paper supply process for controlling the supply and transport of sheets P, manual feed process for determining the timing for manually fed sheets from the manual feed port 41, temperature adjustment process for adjusting the temperatures of the fixing unit 51, belt cleaning process for cleaning the transfer belt 11, lens process for controlling the movement of the main lens 35 in accordance with the copy magnification, input process for receiving signals from the operations keys on the operations panel and the like.

After the aforesaid processes are executed, the internal timers are queued in step 9, then the routine returns to step 2. Thus, the length of one routine is held constant, and while the power is supplied the processing of steps 2 through 9 are repeated.

FIGS. 7a through 7e are flow charts for image formation.

In this routine, in step 20, the image forming state check is executed by checking the image forming state as expressed by the counter value of the state counter, then processing is executed as described hereinafter in accordance with each state.

The standby state following the initialization state immediately after power is turned ON and following the completion of the copy operation is designated state [0].

In state [0], first, a check is run to determine whether or not the print key is ON (step 21). When the print key is ON, the main motor 24 and the PC motor 25 are turned ON to start the rotation of various components such as the photosensitive drum 3 and the like (step 22).

Next, the motor rise time timers are set to await the stabilized rotation of the motors 24 and 25 (step 23), and the image forming state is designated [1] (step 24).

In image forming state [1], the motor rise timer counter value is incremented (step 26), and the completion of said timer is awaited (step 27). Upon completion of the aforesaid timer, the image forming state is designated [2] (step 28).

In image forming state [2], a check is run to determined whether or not the copy mode set by the operation panel is the mono-color mode or the full-color mode (step 41). The process of each mode is executed as described below.

When the mono-color mode has been selected, the flag for the mirror rotation request (ND request) is set to request the positioning of the half mirror 36ND (step 42).

Accordingly, the filter mirror process is executed, and the half mirror 36ND is positioned at the image forming position.

Next, the corona charger 4 and the exposure lamp 33 are turned on (step 43), the scan request is set for starting the scan by the scanner 30 (step 44), one of the developing units 6 through 9 selected by means of the operation panel is turned ON (step 45), and the image forming state is designated [3] (step 46).

In image forming state [3], the end of the scanning of the document D is verified (step 61), the corona charger 4 and the exposure lamp 33 are turned OFF (step 62), and the operating developing unit is turned OFF (step 63).

Then, a check is made to determine whether or not a subsequent copy has been requested (step 64). If a subsequent copy request has not been made, the image forming state is designated [13] (step 68).

The copying machine 1 thereupon enters the standby sate.

If a subsequent copy request has been made, the image forming state returns to state [2] (step 69).

On other other hand, when the full-color mode is specified in step 41 of the previously described image forming state [2], the mirror rotation request (ND request) is set for positioning the half mirror 36ND (step 47), the exposure lamp 33 is turned ON (step 48), the pre-scan request is executed (step 49), and the image forming state is designated state [4] (step 50).

In image forming state [4], the end of the pre-scan is verified (step 75), and the exposure lamp 33 is turned OFF (step 76). Then, the mirror rotation request (B request) is set for positioning the filter mirror 36YB at the image forming position (step 77), the mark detection permission is set for starting the scan with a timing for turning ON the belt mark sensor s72 and 72s (step 78), and the image forming state is designated state [5] (step 79).

In image forming state [5], the start of the scan by the scanner 30 via the belt mark signals S10 is awaited (step 81), the Y toner developing unit 6 is turned ON in conjunction with the start of the scan (step 83), and the image forming state is designated state [6].

In image forming state [6], the end of the scan is verified (step 91), the corona charger 4 and the exposure lamp 33 are turned OFF (step 92), and the Y toner developing unit 6 is turned OFF (step 93). Thereafter, the mirror rotation request (G request) is set for positioning the filter mirror 36MG at the image forming position (step 94), and the image forming state is designated state [7].

In image forming states [7] through [12], a series of processes are executed for forming the M, C and BK toner images in the same manner as previously described for the Y toner image. That is, the developing units 7, 8 and 9 corresponding to each color are turned OFF and ON, the exposure lamp 33 and the corona charger 4 are turned OFF in accordance with the end of the scan by the scanner 30, and the filter mirror 36CR or the half mirror 36ND is positioned in corresponding with the subsequent scan.

In step 124 of the image forming state [12], if a subsequent copy request has not been made, the mark detection permission is reset (step 126), and the image forming state is designated state [13], (step 127).

In image forming state [13], first, the discharge sensor 88 is changed from the ON state to the OFF state, and the completion of sheet P discharge is awaited (step 131). During the time the discharge is not yet completed, a check is made to determine whether or not the print key hand been turned ON (step 133). When the print key has been turned ON, the image forming state is designated state [2], and the routine moves on to the next copy operation (step 134).

When the sheet P discharge is completed, the image forming state is designated state [14] (step 132).

In image forming state [14], a process is executed to position the detection mark 95 so as to be in non-contact with the rollers 12 through 16 while the PC motor is stopped.

That is, when the belt mark signals S10 have been output (step 141), the main motor 24 and the PC motor 25 are stopped (step 142), and enter the standby state (step 143) designated image forming state [0].

Thus, the detection mark 95 is stopped at a position near the belt mark sensors 72 and 72s so as to be away from the rollers 12 through 16.

While the belt mark signals S10 are not being output, a check is made to determine whether or not the print key has been turned ON (step 144). When the print key is ON, the image forming state is designated [2], and the subsequent copy operation is entered (step 145).

FIG. 8 is a flow chart of the scanning process.

First, a check is made of the scan state (step 200). The process of each scan state is executed as described below.

In scan state [0], a check is made to determine whether or not a scan is requested (step 201). If a scan is requested, the outward movement of the scanner 30 is started (step 202).

If a scan is not requested, a check is made to determine whether or not a scan is permitted (step 204). The scan permission flag is set when the scan start is enabled by the belt mark signals S10. When the scan is permitted, the scan state is designated state [1] (step 205).

In scan state [1], the output of the belt mark signals S10 is awaited (step 211), and the outward movement of the scanner 30 is started (step 212). Thus, during full color copying, each color toner image is overlaid at the same position on the surface of the transfer belt 11.

In scan state [2], a check is made to determine whether or not the outward movement of the scanner 30 has reached the trailing edge of the document D and the scan has ended (step 215).

If the scan has ended, the return of the scanner 30 is immediately started (step 216), and the scan state is designated state [3] (step 217).

In scan state [3], a check is made to determine the detection state of the scanner home switch 74 (step 218). After the end of the return of the scanner 30 to the home position is verified, the scan state returns to the initial value of [0].

Figure 9A:
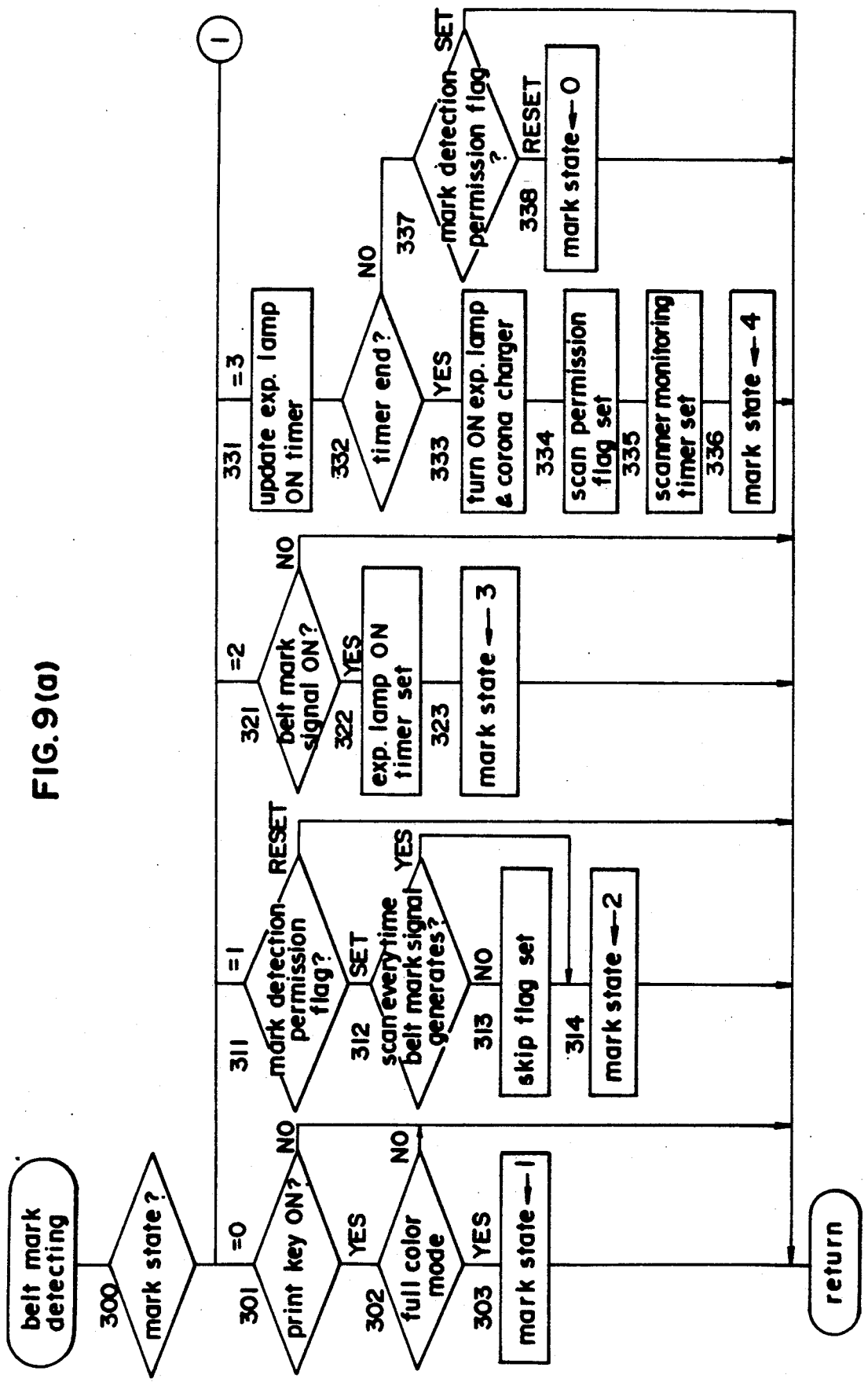
Figure 9:
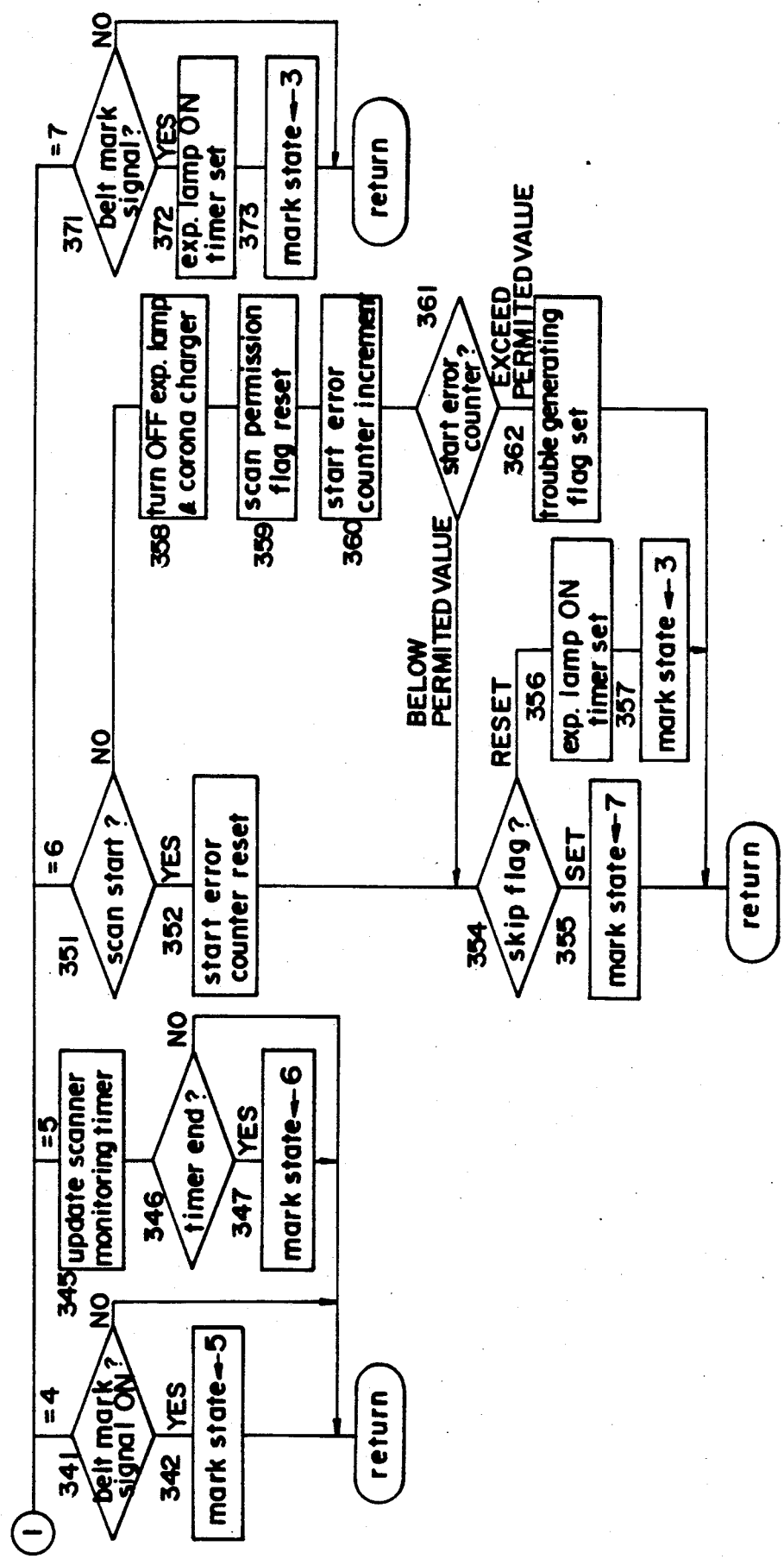

FIG. 9 is a flow chart of the belt mark detection process.

First, the mark state is checked in step 300. The process of each mark state is executed as described below.

In mark state [0], when the print key on the operation panel is turned ON, and at the same time, the full-color mode is specified (replies to queries in steps 301 and 302 are YES), the mark state is designated state [1](step 303).

In mark state [1], first, in image formation, the setting of the mark detection permission flag is awaited (step 311).

When the mark detection permission flag is set, then, a scan table (not shown in the drawings) is referenced in correspondence with the paper size or document size and copy magnification, and a check is made to determine whether or not a scan is permitted each time a belt mark signal S10 is generated (step 312).

If a scan is permitted every time a belt mark signal S10 is generated, the routine moves to step 314 and the mark state is designated state [2].

If a scan is not permitted every time a belt mark signal S10 is generated, the skip flag is set for nullifying the scan with each generation of the belt mark signal S10 (step 313). Thereafter, the mark state is updated.

The scan table predetermines the times for the reciprocal movement of the scanner 30 based on the cross correlations of the size of the sheet P detected by the paper size sensors 81 and 82 in autofeed mode or the size of the document D detected by the document size detecting device 101 in manual feed mode, and the copy magnification set by the ten-key pad on the operation panel. The generation frequency of the belt mark signals S10 of either [1] or [2], which is a requirement to start scanning, is stored in memory as data.

For example, an A3 size (A3 size height) sheet P may be fed in the lengthwise direction, or an A3 size document D may be disposed on the document platen 28 so as to be scanned in the lengthwise direction. Likewise, an A4 size (A4 size width) sheet P may be fed so that the lengthwise direction is fed perpendicular to the transport direction, or an A4 size document D may be disposed on the document platen 28 so that the lengthwise direction intersects the scan direction.

In the copying machine 1, the length of the transfer belt 11 is 450 mm, and in the normal copy mode the system speed is 110 mm/second.

Accordingly, the time for a single rotation of the transfer belt 1 (belt mark signal generation cycle) is 4.09 seconds.

On the other hand, the time required for the reciprocal movement of the scanner 30 comprising each period of acceleration, constant speed and deceleration, differs depending on the size of the sheet P or the document D and the copy magnification.

For example, when equal copy magnification is executed for an A4 width document D, the time required for reciprocal movement is 3.0 seconds (outward travel is 2.2 seconds and return travel is 0.8 seconds). In this case, the travel time is shorter than the belt mark signal S10 generation cycle, so that the scan can be started successively each time the belt mark signal S10 is generated (each cycle of the transfer belt).

In contrast, when an A3 height document D even at equal copy magnification, the time for the reciprocal travel of the scanner 30 is 5.4 seconds (outward travel is 4.2 seconds and return travel is 1.2 seconds). In this case the travel time is longer than the belt mark signal S10 generation cycle, so that the scan cannot be started successively each time the belt mark signal S10 is generated (each cycle of the transfer belt). Accordingly, in this instance, every other belt mark signal S10 generation is nullified, and the scan is started every second time the belt mark signal S10 is generated.

Therefore, even when a document of unknown size is manually fed, a single scan per two rotations of the transfer belt 11 can be prevented for a small size document, and a reduction in the copy speed can also be avoided.

Returning again to FIG. 9, the belt mark signal S10 is checked in image forming state [2] (step 321).

If the belt mark signal S10 is ON (output), the exposure lamp ON timer (counter type) is set in step 322 to determine the timing for lighting the exposure lamp 33, and the mark state is designated state [3] (step 323).

The transfer belt 11 is rotatably driven at constant speed (system speed), and the belt mark signal S10 generation cycles are uniform. Accordingly, the exposure lamp ON timer is provided in the copying machine 1 to light the exposure lamp 33 after a specified time has elapsed from the belt mark signal S10 generating prior to the belt mark signal S10 generating upon the start of the scan so as to stabilize the amount of light emitted by the exposure lamp 33 when the scan starts based on the belt mark signal S10.

Thus, unnecessary lighting of the exposure lamp 33 and scanning under unstable light volume can be prevented.

In mark state [3], the end of the exposure lamp ON timer is awaited (steps 331 and 332).

At this time, the mark detection flag is again checked during the operation of the exposure lamp ON timer (step 337), and when the mark detection flag is reset during image formation, the mark state is designated [0] to enter the standby state for copying machine 1.

If the time of the exposure lamp ON timer has ended, the exposure lamp 33 and the corona charger 4 are turned ON in preparation for scanning (step 333), and the scan permission flag is set the which is checked by the previously described scan process (step 334).

Thereafter, the scan monitoring timer is set to check the scan start timing (step 335), and the mark state is updated to state [4].

In mark state [4], the output of the belt mark signal S10 is awaited (step 341). When the belt mark signal S10 is output the mark state is designated state [5].

In mark state [5], the scan monitoring timer counter is incremented (step 345), and the end of the timer is checked (step 346). When a specified period has elapsed after the belt mark signals S10 are ON and the scan monitoring timer has ended, the mark state is designated state [6].

In mark state [6], first, a check is made to determine whether or not the scan has started in the scan process.

When the scan has started, the start error counter is reset to indicate the frequency for the start error of the scan when the scan is not to be started with standard frequency (step 352).

Then, the skip flag is checked (step 354).

When the skip flag is in the reset state, a scan starts each time a belt mark signal S10 is generated, and the exposure lamp ON timer is immediately set (step 356). The mark state returns to the state [3] in preparation of a subsequent scan.

When the skip flag is in the set state, a scan starts every second time a belt mark signal S10 is generated, and the mark state becomes state [7] (step 355). In mark state [7], the belt mark signal S10 output is awaited, the exposure lamp ON timer is set (step 372), and the mark state returns to state [3].

On the other hand, when the reply to the query in step 351 is NO, the scan does not start for whatever reason even if the scan start timing obtains, and the exposure lamp 33 and the corona charger 4 are temporarily turned OFF (step 358), and the scan permission flag is reset (step 359). Thereafter, the start error counter is incremented (step 360).

Next, the start error counter value is checked (step 361).

If the start error counter value is less than a specific permitted value, the routine returns to the previously described step 354 to test that scan start again.

In contrast, when the start error counter value exceeds a specified permitted value, the trouble generating flag is set to start the trouble process (step 362).

Figure 10:
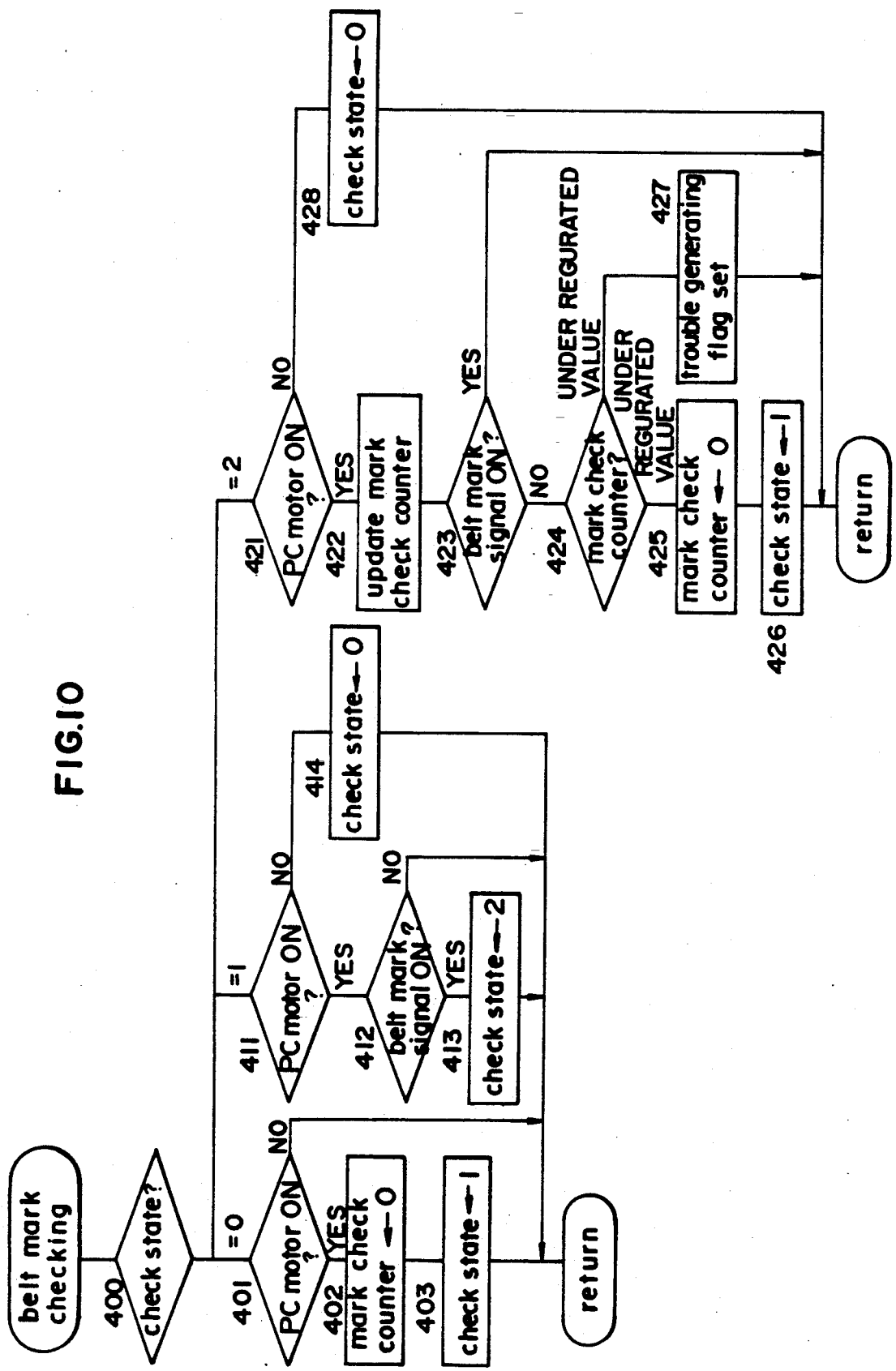

FIG. 10 is a flow chart of the belt mark checking process.

First, the check state is checked (step 400). The process of each check state is executed as described below.

In check state [0], a check is made to determine whether or not the PC motor 25 that rotates the transfer belt 11 is operating (step 401). If the reply to the query is YES, the mark check counter for counting the detection time of the belt mark signals S10 is cleared and set at [0] (step 402). The check state is then designated state [1] (step 403).

Check state [1] is the state wherein the start of measurement is awaited for the detection time of the belt mark signals S10 while the PC motor 25 is operating.

In check state [1], a check is run to determine whether or not the PC motor 25 is operating (step 411). When the PC motor 25 is stopped, the check state returns to state [0] (step 414).

When the PC motor 25 is operating, a check is run to determine whether or not belt mark signals S10 are being output (step 412). If the reply to the query is YES, the check state is designated state [2] (step 413).

Check state [2] is the state wherein the actual detection time for the belt mark signals S10 is measured.

In check state [2], a check is run to determine whether or not the PC motor 25 is in operation (step 421). The detection time is measured only if the reply to the query is YES. If the reply to the query is NO, the check state returns to state [0] (step 427).

When the reply to the query in step 421 is YES, the mark check counter is updated (step 422), and a check is run to determine whether or not the belt mark signals S10 ar still being output (step 423). If the reply to the query is YES, the routine returns.

If the reply to the query in step 423 is NO, the contents of the mark check counter, i.e., the belt mark signal S10 detection time, is checked (step 424).

When the mark detection time is less than a specified value, the transfer belt 11 slippage perpendicular to the direction of rotation has exceeded the permitted value, and the trouble generating flag is set to start the trouble process (step 427).

When the mark detection time exceeds the standard value, the mark check counter is cleared (step 425), the check state is designated [1], and the subsequent belt mark signal S10 output is awaited (step 426).

Although the counter value of the mark check counter is compared to a standard value in step 424 to detect the slippage of the transfer belt 11 perpendicular to the direction of rotation, other methods may be used such as pre-storing every counter value in memory so as to allow comparison of the counter value detected in the previous cycle with the counter value detected in the current cycle.

Figure 11:
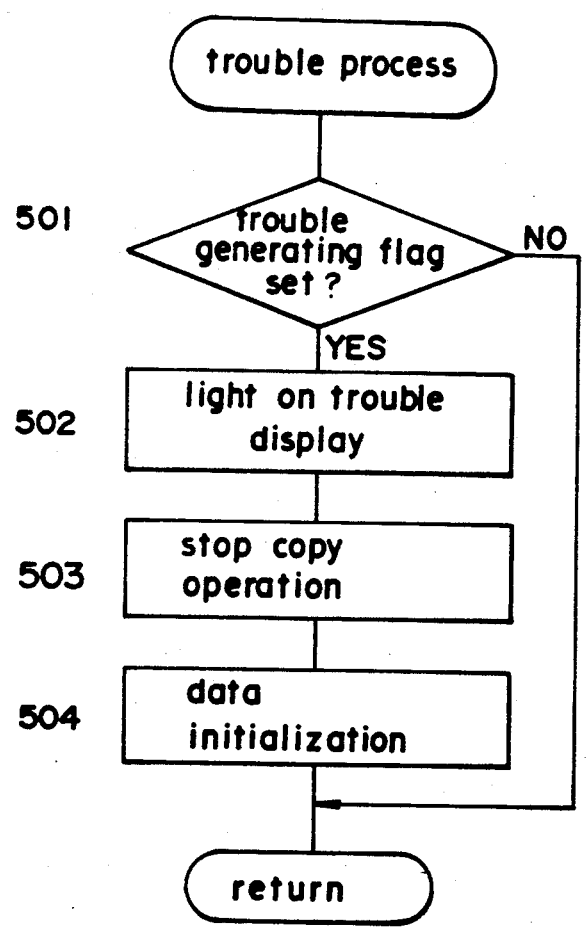

FIG. 11 is a flow chart of the trouble process.

First, a check is run to determine whether or not the trouble generating flag is set (step 501).

When the trouble generating flag has been set, the trouble display LED is lighted to alert the operation (step 502), all output loads of the main motor 24 and the PC motor 25 and the like are stopped, the copy operation is halted and the copy operation 1 enters the static state (step 503).

Next, data initialization is executed (step 504), and the trouble state recovery is awaited.

Although the hole 95a is a circular hole in the previously described embodiment, said hole 95a may also be avoid, ellipsoid or other suitable curve or linearly encompassed shape. The shield plate 95b may also be affixed to the surface on the exterior side of the transfer belt 11. The shield 95b may be attachable to the transfer belt 11 by various methods. Although the detection mark 95 was provided to control the start timing of the movement of the scanner 30, said detection mark 95 may also be provided for control to prevent the image being formed on the seam of the image bearing belt.

Moreover, the contents and sequence of the flow charts, the construction, configuration, number material timing and the like of the transfer belt 11, rollers 12 through 16, belt mark sensors 72 and 72s, detection mark 95, controller 400, and copying machine 1 may be variously modified so as to differ from the previous description thereof.

Although the present embodiment of the invention has been described in terms of an image bearing belt acting as the transfer belt 11 of copying machine 1, it should be noted that the present invention is suitable for use as an image bearing belt acting as a phptosensitive belt in a copying machine. Further, the present invention is suitable for use in digital type copying machines, LED type page printers, laser printers and the like.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A detecting device for detecting a position of a rotatable member, said detecting device comprising:
    detectable means provided as the rotatable member for indicating the position of the member, the detectable means being so shaped as to have a length in a member rotation direction which varies in a direction perpendicular to the member rotation direction;
    detecting means fixed adjacently to the rotatable member for detecting said detectable means;
    determining means for determining that the detectable means passes the detecting means; and
    judging means for judging that the rotatable member slips in a direction perpendicular to the member rotation direction based on a time from the detection of the detectable means to determination of the detectable means passage.

2. A detecting device as claimed in claim 1 wherein said detecting means further comprises a light emitting member and a light receiving member which confront each other through the rotatable member.

3. A detecting device as claimed in claim 2 wherein the detectable means further comprises a hole provided in the rotatable member so that light from the light emitting member is transmitted through the hole to be received by the light receiving member.

4. A detecting device for detecting a position of a rotatable member, said detecting device comprising:
    a hole provided in the rotatable member;
    a shading sheet plate disposed at the rotatable member for shading a portion of the hole from light; and
    a sensor fixed adjacently to the rotatable member for detecting an edge portion of said shading sheet plate, said sensor including a light emitting member and a light receiving member which confront each other through the rotatable member for detecting the hole when the light from the light emitting member is received by the light receiving member through the hole of the rotatable member.

5. A detecting device as claimed in claim 4 wherein said hole of the rotatable member has a circular or an apolitical shape.

6. A detection device for detecting a position of a rotatable belt, which comprises:
    a reference means provided at the rotatable belt for indicating the position of the rotatable belt, the reference means being so shaped to have a length in a belt rotation direction which varies in a direction perpendicular to the belt rotation direction;
    a sensor for detecting the reference means at the rotatable belt.
    determining means for determining that the reference means passes the sensor; and
    judging means for judging that the rotatable belt slips in a direction perpendicular to the belt rotation direction based on a change of a time from a start of the reference means detection to the determination of the reference means passage.

7. A detecting device for detecting the position of a rotatable transfer member to which a toner image is transferred in an a image forming apparatus, which comprises:
    a hole provided in the rotatable transfer member for indicating a position of the rotatable transfer member; and
    a sensor fixed adjacently to the rotatable transfer member for detecting the hole in order to detect the position of the rotatable transfer member.

8. A detecting device as claimed in claim 7 whereon the hole has a length in the member rotation direction which carries in a direction perpendicular to the member rotation direction.

9. A detecting device as claimed in claim 8, further comprising:
    determining means for determining that the hole of the rotatable transfer member passes the sensor; and
    judging means for judging that the rotatable transfer member slips in a direction perpendicular to the member rotation direction based on a time from the detection of the hole to the determination of the hole passage.

10. A detecting device provided in an image forming apparatus comprising image forming means for forming a plurality of toner images the color of which are different from each other, and a rotatable transfer member to which the plurality of toner images are sequentially transferred, said detecting device comprising:
    a plurality of detectable means provided at the transfer member, the detectable means is so shaped to have a length in a transfer member rotation direction which varies in a direction perpendicular to the transfer member rotation detection;
    detecting means fixed adjacent to the transfer member for detecting said detectable member;
    determining means for determining that the detectable means passes the detecting means;

control means for controlling the image forming means so as to start operation in response to the detectable means detection;

judging means for judging that the transfer member slips in a direction perpendicular to the transfer member rotation direction according to a time from the detection of the detectable means to the determination of the detectable means passage.

11. A method for detecting a position of a rotatable belt, said method comprising the steps of:

providing a detectable means at the rotatable belt, the detectable mans having a length in a belt rotation direction which varies in a direction perpendicular to the belt rotation direction;

detecting the detectable means in order to detect the position by a sensor;

determining that the detectable means passes the sensor; and judging that the rotatable belt slips in a direction perpendicular to the belt rotation direction according to a time from the detection of the detectable means to the determination of the detectable means passage.

12. A detecting device for detecting a position of a rotatable member, said detecting device comprising:

detectable means provided at the rotatable member for indicating the position of the rotatable member, the detectable means being so shaped as to have a length in a member rotation direction which changes in a direction perpendicular to the member rotation direction;

detecting means fixed adjacently to the rotatable member for detecting said detectable means;

determining means for determining that the detectable means passes the detecting means; and judging means for judging that the rotatable m ember slips in a direction perpendicular to the member rotation direction based on a time of determination of the detectable means passage.

* * * * *